UNITED STATES PATENT OFFICE.

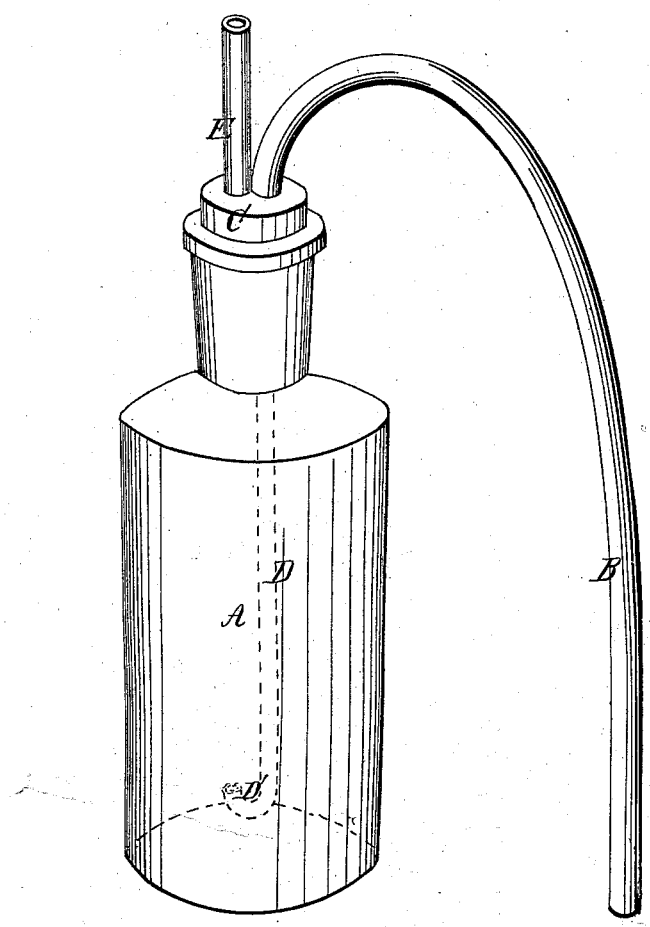
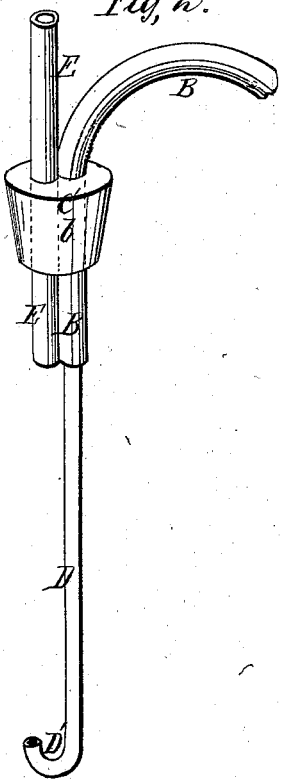

G. W. DOTY, OF RAVENNA, OHIO.

IMPROVED SIPHON-BOTTLE.

Specification forming part of Letters Patent No. 47,705, dated May 16, 1865.

*To all whom it may concern:*

Be it known that I, G. W. DOTY, of Ravenna, in the county of Portage and State of Ohio, have invented certain new and useful Improvements in a Combined Siphon and Bottle for Chemical Uses; and I do hereby declare that the following is a full and complete description of the construction and operation of the same, reference being had to the accompanying drawings, making a part of this specification, in which—

Figure 1 is a perspective view of the bottle and siphon. Fig. 2 is a detached section, or it represents the siphon with its connections detached from the bottle.

Like letters of reference denote like parts.

My improvement relates to a combined siphon and bottle for chemical uses, described as follows:

In Fig. 1, A represents an ordinary glass bottle, which can be of any desired form or size. The siphon consists of an elastic tube, B, one end of which passes through the cork C of the bottle, as shown, and indicated by the dotted lines $b$ in Fig. 2, and a glass tube, D, inserted in the end of the tube that extends down into the bottle till near the bottom, as indicated by the dotted lines in Fig. 1. The lower end of this tube is turned or curved upward, as at D'. Alongside of the tube B, where it passes through the cork, there is a tube, E, as shown in the figures. The object of this tube is to introduce air into the bottle by the mouth or otherwise, that will cause the solution to rise in the siphon running through the tube B. A siphon thus constructed and arranged, in connection with a bottle, is of great practical utility in using decanted solutions for any purpose, especially for photography.

In treating solutions or tinctures to be decanted—such as the nitrate of silver as used by photographers—the object is to hold the solution in the bottle, which forms a decanter, the sediment or organic matter all settling to the bottom, leaving the pure solution above, which is purer than can be obtained in the ordinary way. From the form of the siphon, being curved upward at the lower end, the pure solution will rise in the siphon without disturbing in the least the sediment below. As used in photography, the operator, by blowing into the tube E, causes the decanted solution to rise in the tube D and flow through the tube B, by which the plates can be treated in the most easy and desirable manner without disturbing the sediment. As the siphon is formed by a glass tube being connected with a rubber tube, as described, the siphon is rendered elastic, so that the tube can be moved round in any way, as may be required in the process of photography. As the tube D is glass, the solution in the bottle is in no way injured by being in constant contact with it, as it would be if the rubber tube extended into the solution, when chemical action would take place, thereby injuring the solution, which the glass tube entirely obviates.

What I claim as my improvement, and desire to secure by Letters Patent, is—

The tubes B and D, in combination with the tube E and bottle, when connected and arranged substantially as described.

G. W. DOTY.

Witnesses:
W. H. BURRIDGE,
J. HOLMES.